(12) United States Patent
Paltiel et al.

(10) Patent No.: US 8,219,227 B2
(45) Date of Patent: Jul. 10, 2012

(54) MERGING VARIABLE DATA FOR PACKAGING IMPOSITION

(75) Inventors: Barak Paltiel, Rosh Ha-Ayin (IL); Suzi Hagay, Zur Yigal (IL)

(73) Assignee: Eastman Kodak Company, Rochester, NY (US)

( * ) Notice: Subject to any disclaimer, the term of this patent is extended or adjusted under 35 U.S.C. 154(b) by 544 days.

(21) Appl. No.: 12/193,784

(22) Filed: Aug. 19, 2008

(65) Prior Publication Data

US 2010/0043354 A1 Feb. 25, 2010

(51) Int. Cl.
*G06K 15/00* (2006.01)
*G06F 3/12* (2006.01)
*G06F 19/00* (2011.01)

(52) U.S. Cl. ....... 700/97; 358/1.12; 358/1.13; 358/1.14; 358/1.15; 358/1.18; 700/95; 700/90

(58) Field of Classification Search ........................ None
See application file for complete search history.

(56) References Cited

U.S. PATENT DOCUMENTS

| | | | | |
|---|---|---|---|---|
| 4,447,479 A | * | 5/1984 | Harrison et al. | 428/36.4 |
| 6,332,149 B1 | | 12/2001 | Warmus et al. | |
| 6,760,638 B1 | * | 7/2004 | Love et al. | 700/98 |
| 7,346,408 B2 | * | 3/2008 | Van Bael et al. | 700/98 |
| 7,599,088 B2 | * | 10/2009 | Bru | 358/1.18 |
| 2003/0098994 A1 | * | 5/2003 | Tacke | 358/1.18 |
| 2003/0189726 A1 | * | 10/2003 | Kloosterman et al. | 358/1.18 |
| 2004/0008371 A1 | | 1/2004 | Keane et al. | |

FOREIGN PATENT DOCUMENTS

WO WO 2005/122010 A1 12/2005

\* cited by examiner

*Primary Examiner* — Albert Decady
*Assistant Examiner* — Sunray Chang
(74) *Attorney, Agent, or Firm* — Nelson Adrian Blish (57) ABSTRACT

A printing imposition method for creating packaging imposition schemes includes providing target printing sheet properties; providing at least one designed package element (23, 26, 27) wherein the designed package element includes at least one variable information object (92, 93, 94); providing variable information data (44, 45, 46, 47) to be inserted in at least one variable information object; creating variable package elements (95, 96, 97) by merging the variable information data (44, 45, 46, 47) and at least one variable information object (92, 93, 94) in at least one designed package element (23, 26, 27); and performing step and repeat of the variable package elements on the target printing sheet (70) according to the target printing sheet properties.

11 Claims, 9 Drawing Sheets

MERGING VARIABLE DATA FOR PACKAGING IMPOSITION

FIELD OF THE INVENTION

The present invention relates in general to print imposition methods for creating personalized packages and in particular to merging variable information for packaging impositions.

BACKGROUND OF THE INVENTION

Graphic arts jobs prepared for packaging printing use a special workflow. The workflow is dependent upon the design of the intended package. A package is often a cardboard box used to carry commercial merchandise, such as electronic devices or food products. Each box comes in different sizes, with different graphic art content printed on each box.

Figure 1:
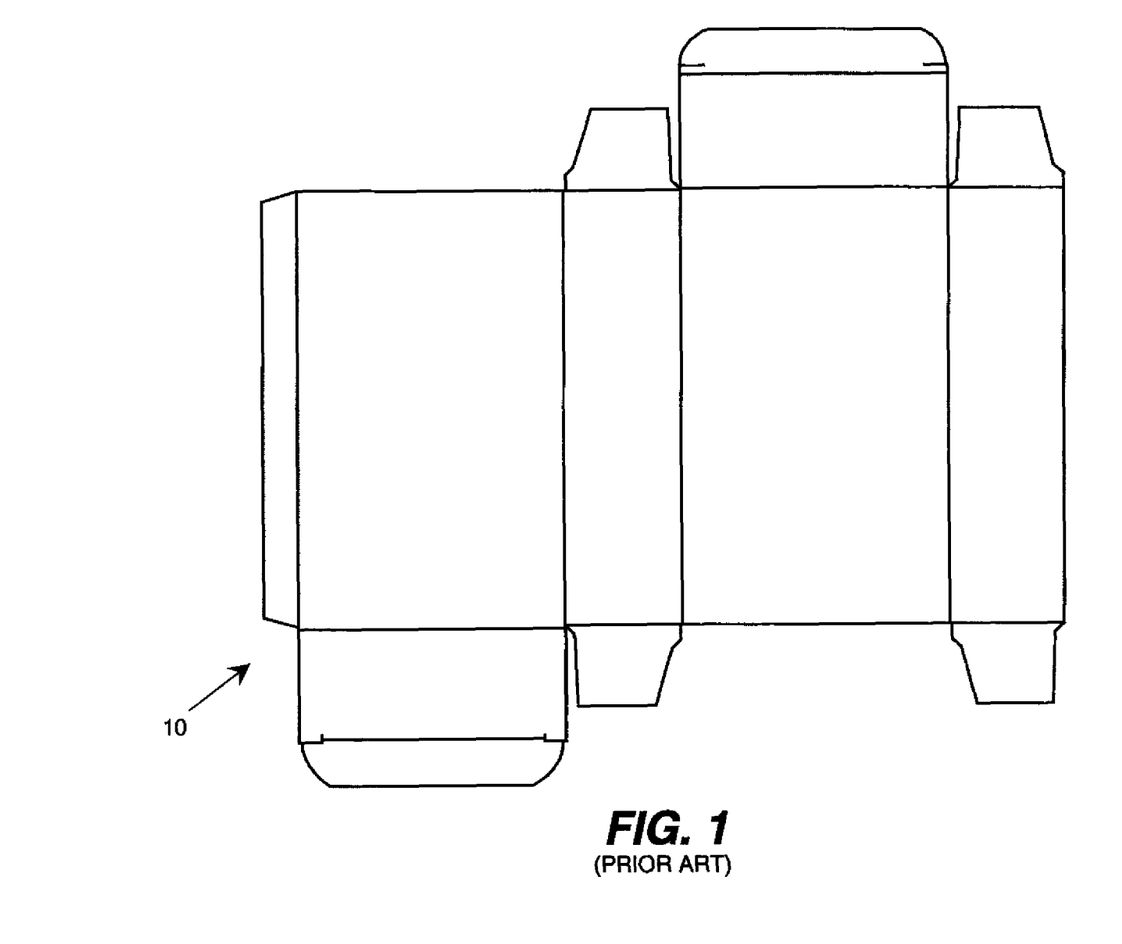
FIG. 1 is a schematic illustrating a prior art packaging element die cut design.

FIG. 1 illustrates a design of such a packaging element 10, showing a flattened two-dimensional representation of a package. Such designs are often prepared by computer aided design (CAD) applications such as ArtiosCad from EskoArtworks or Impact from Arden Software.

Figure 2A:
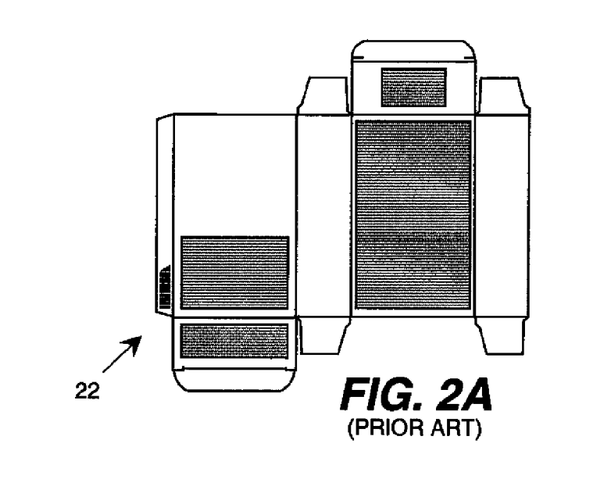
FIGS. 2A, 2B, 2C are schematics illustrating prior art packaging elements each populated with different graphic designs.
Figure 2B:
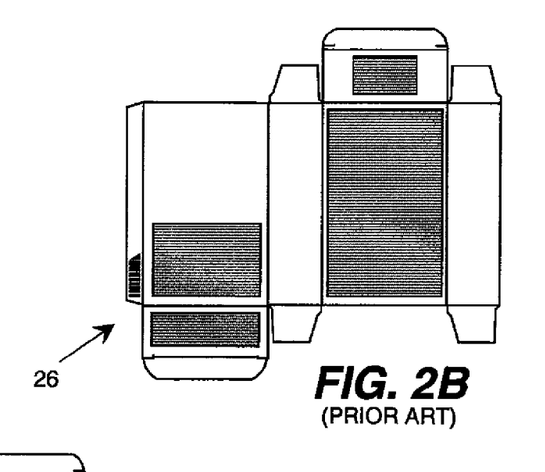
Figure 2C:
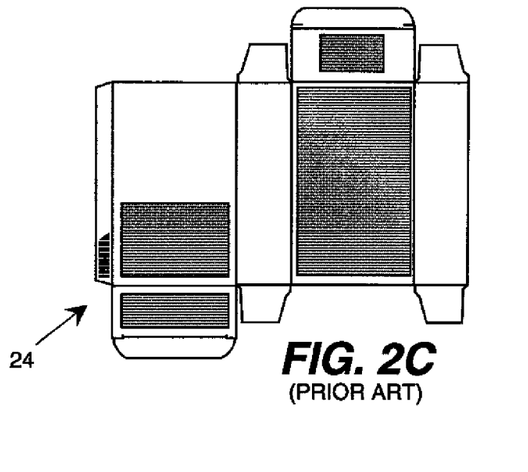

FIGS. 2A, 2B, and 2C each illustrates a different content applied on a packaging element 10 forming different packages 22, 24, and 26. A typical example can be a juice product manufacturer. Each package has an identical design with different content printed on them, for example citrus, orange, and apple juices. The graphic art design and content is often prepared by graphic arts designers using packages such as Adobe Creative Suite or Quark Xpress.

Figure 3:
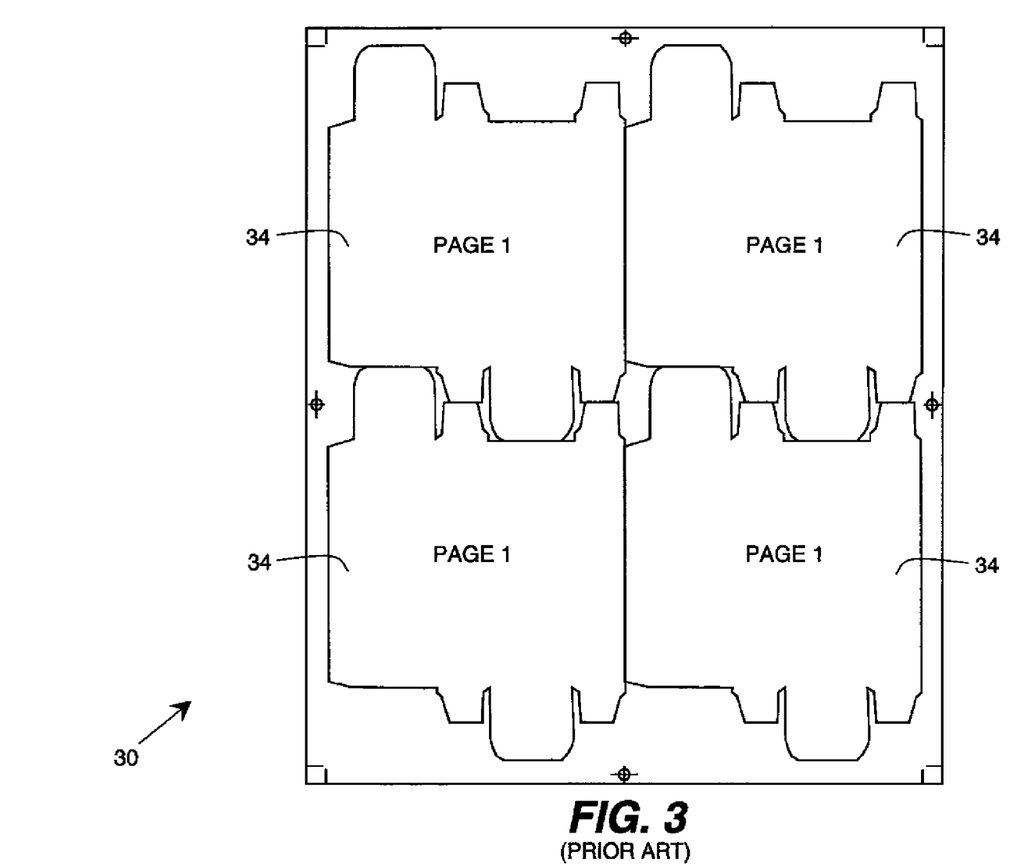
FIG. 3 is a schematic illustrating prior art imposition layout sheet with same packaging element.

FIG. 3 illustrates an example of a designed printed imposition sheet 30. The imposition sheet example contains four identical packaging elements 34 populated on same imposition sheet.

A packaging element 10 is typically a non-rectangular shape as is shown in FIG. 1. Organizing such shapes on a given printed imposition sheet 30 is achieved by dedicated package design applications such as Pandora or StepOne from Kodak. A packaging design workflow will include at least the following steps:

1. Design the step and repeat the packaging shape only resulting with a text file written according to at least one of the following packaging oriented file formats: CFF2/DDES2/DXF containing sheets size information and data describing the single packaging shape and step, and repeat of each instance. Each step contains position and orientation information.
2. The data created in the first step will be imported by a graphic art design step and repeat application such as Kodak Pandora. Each repeat will be assigned graphic arts (artworks) information. The application user may further populate all repeats with the same artwork, or may assign different artworks for different repeats.
3. The data from the first step is converted into Postscript/PDF and imported into a design package such as Adobe Creative Suite where each repeat is assigned graphic arts (artworks) information in a manual fashion. The user may further populate all repeats within the same artwork, or may assign different artworks for different repeats.

With the introduction of personalized printing, each printed document can directly be addressed to a specific recipient. Such personal documents can accommodate personal information such as name and address, but may also allow different image content. For example, an advertisement can be directed to populations that differ in age, wealth, and venue. Variable data printing (VDP) jobs are well established, however, it is not used for, or easily adapted to, design and print of packaging jobs.

The proposed invention described hereunder provides a solution for variable data printing in packaging printing.

SUMMARY OF THE INVENTION

Briefly, according to one aspect of the present invention a printing imposition method for creating packaging imposition schemes includes: providing target printing sheet properties; providing at least one designed package element wherein the designed package element includes at least one variable information object; providing variable information data to be inserted in at least one variable information object; creating variable package elements by merging the variable information data and at least one variable information object in at least one designed package element; and performing step and repeat of the variable package elements on the target printing sheet according to the target printing sheet properties.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

In the variable data printing (VDP) world, assigning different artworks to similar repeats cannot be performed manually as is done for non-VDP packaging jobs.

The number of instances representing different artwork in a VDP packaging job can amount to the hundreds or thousands of different instances. Such a job cannot be practically handled manually by an operator, dressing each repeat with different information.

Figure 4:
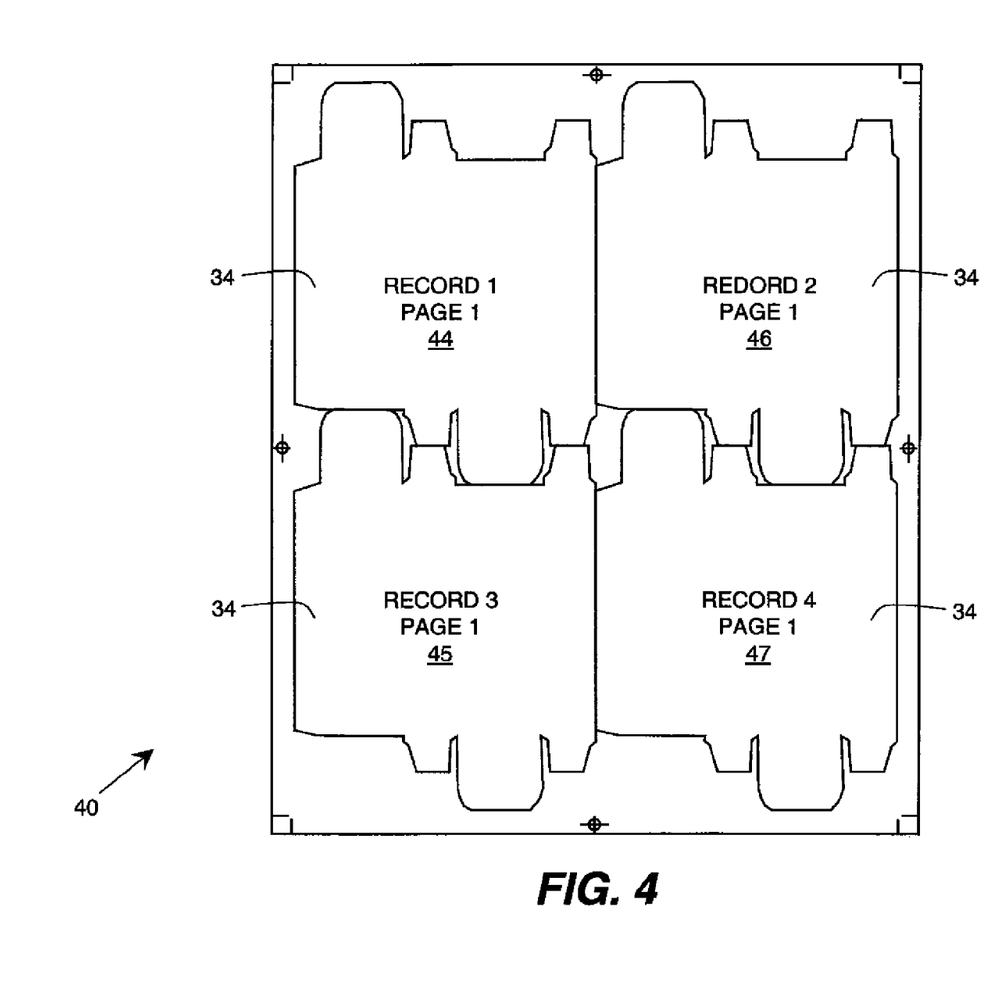
FIG. 4 is a schematic illustrating an imposition layout sheet with the same packaging element including variable elements according to the present invention.
Figure 9:
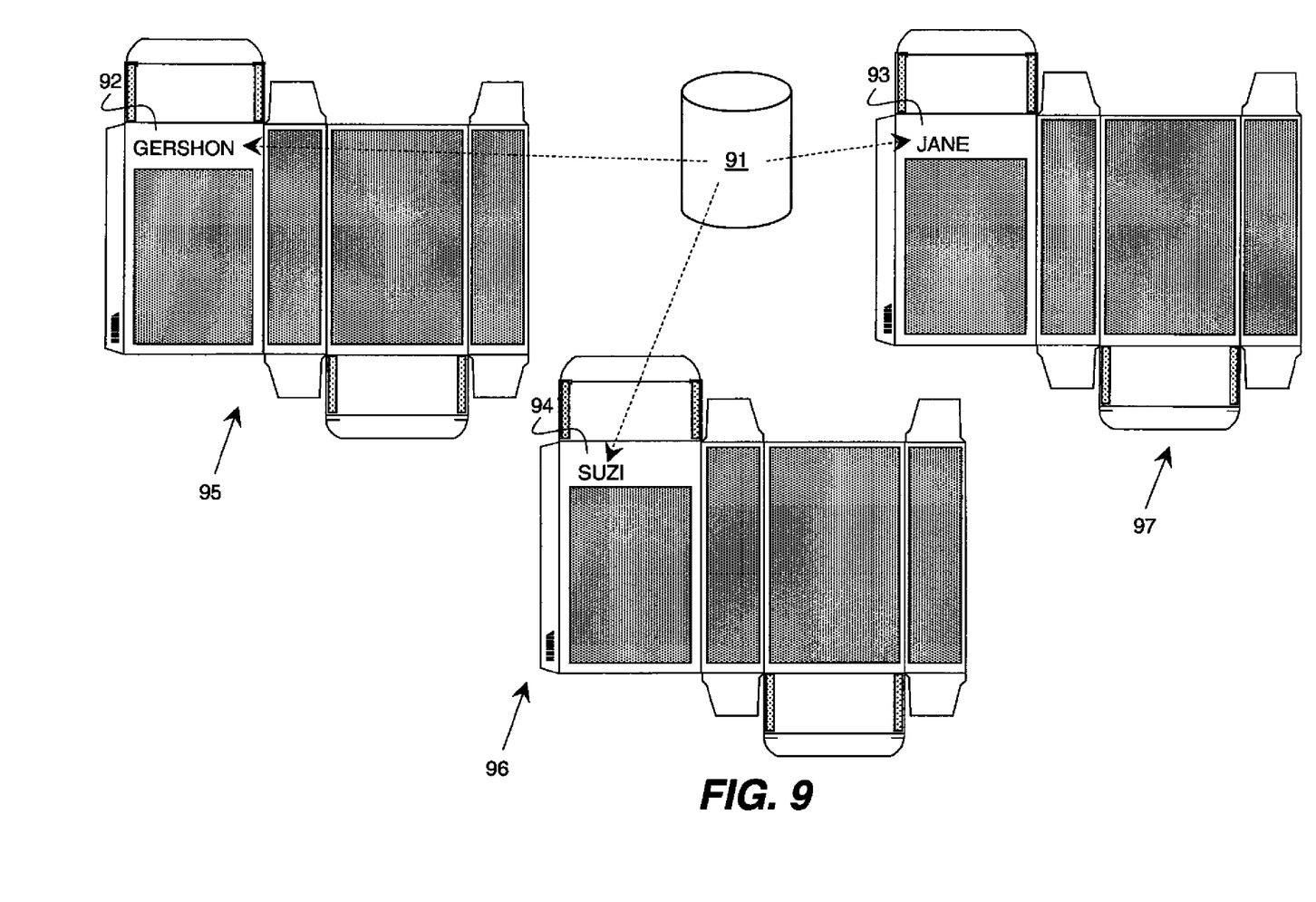
FIG. 9 is a schematic illustrating generation of variable packaging documents out of variable data records repository.

FIG. 4 illustrates a packaging imposition sheet 40. The packaging element 34 is identical for all four instances on packaging imposition sheet 40. Additionally each instance having a variable component (44, 45, 46, 47) attached to each of the packaging elements 34. FIG. 9 shows variable components 92, 93, 94 retrieved from variable data records repository 91 and each record is populated into a newly generated variable packaging documents 95, 96, 97. This example shows variable components of text type, but each record can be of a different type such as image or graphics, for example. Various variable components can be configured and automatically graphically positioned on a different variable place holder on each packaging element 34. The amount of records in such variable data repository can be very large, hence resulting in very large number of packaging elements created automatically to conform with the different records.

Figure 5:
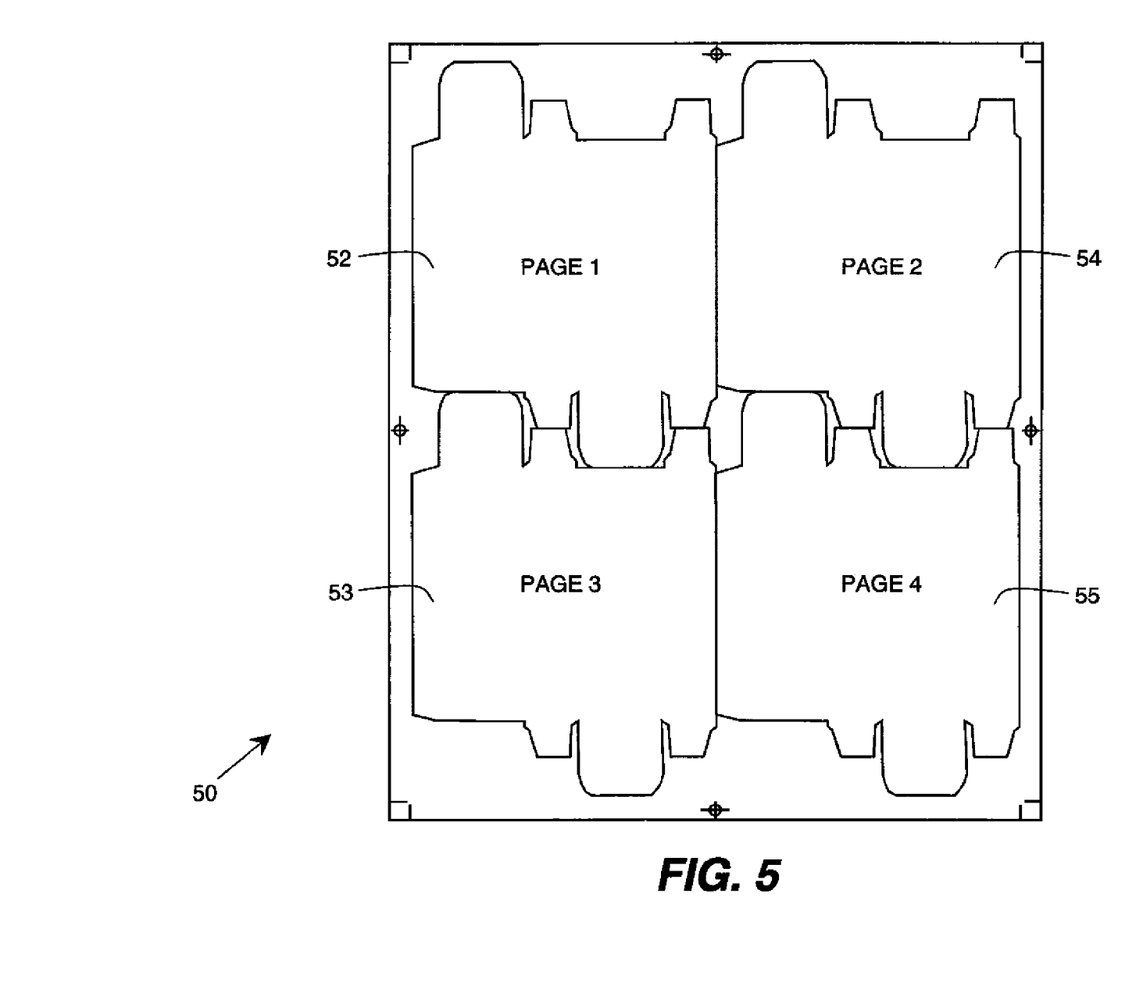
FIG. 5 is a schematic illustrating an imposition layout sheet with a packaging element containing different content.
Figure 6:
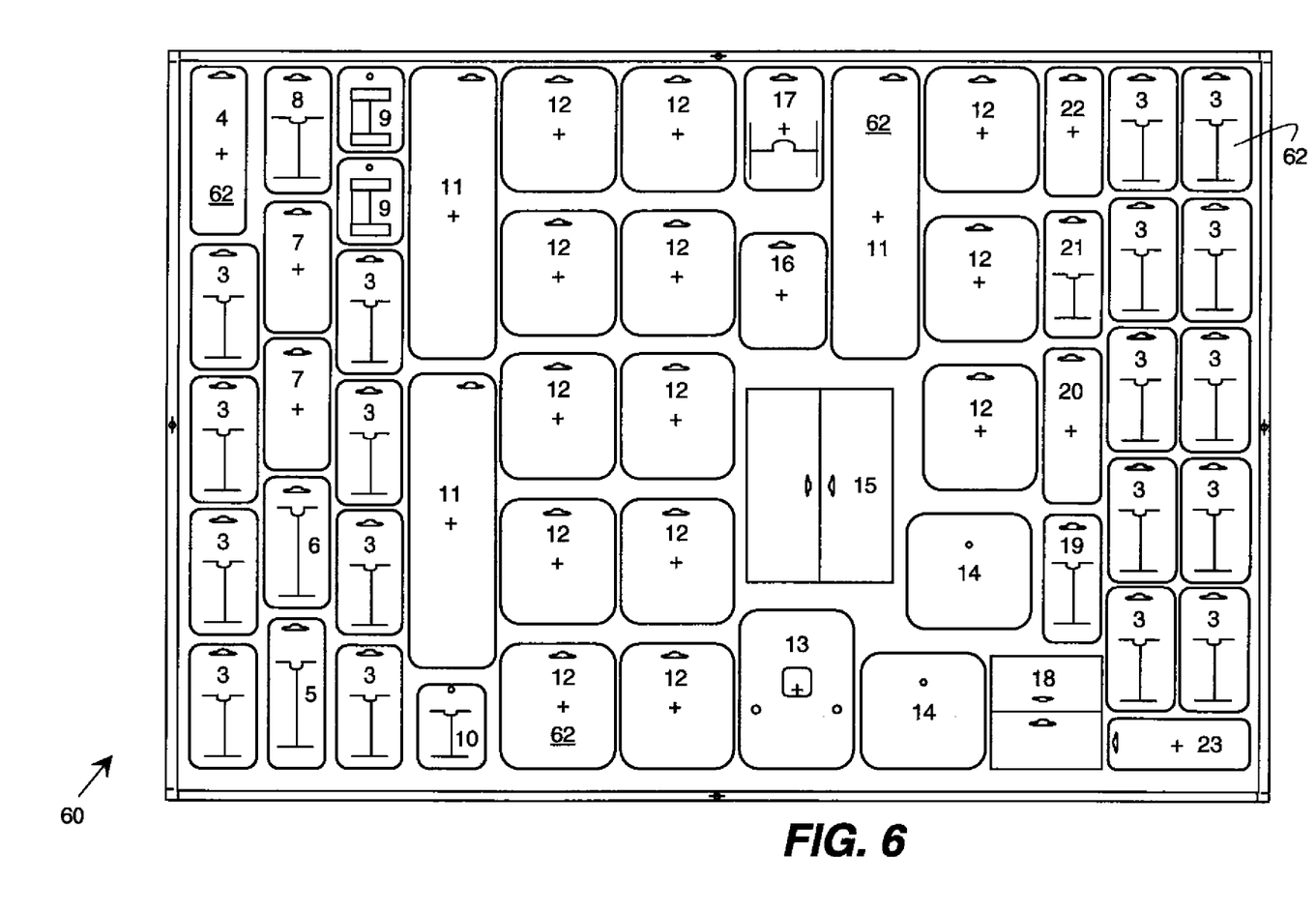
FIG. 6 is a schematic illustrating an imposition layout sheet including packaging elements with different design and content.

FIG. 5 illustrates a packaging imposition sheet 50 having packaging components with different artwork but same die cut design (52, 53, 54, 55) imposed on packaging imposition sheet 50. FIG. 6 shows packaging imposition sheet 60 with plurality of packaging element 62, each different in die cut design as well as in different artwork design.

Figure 7:
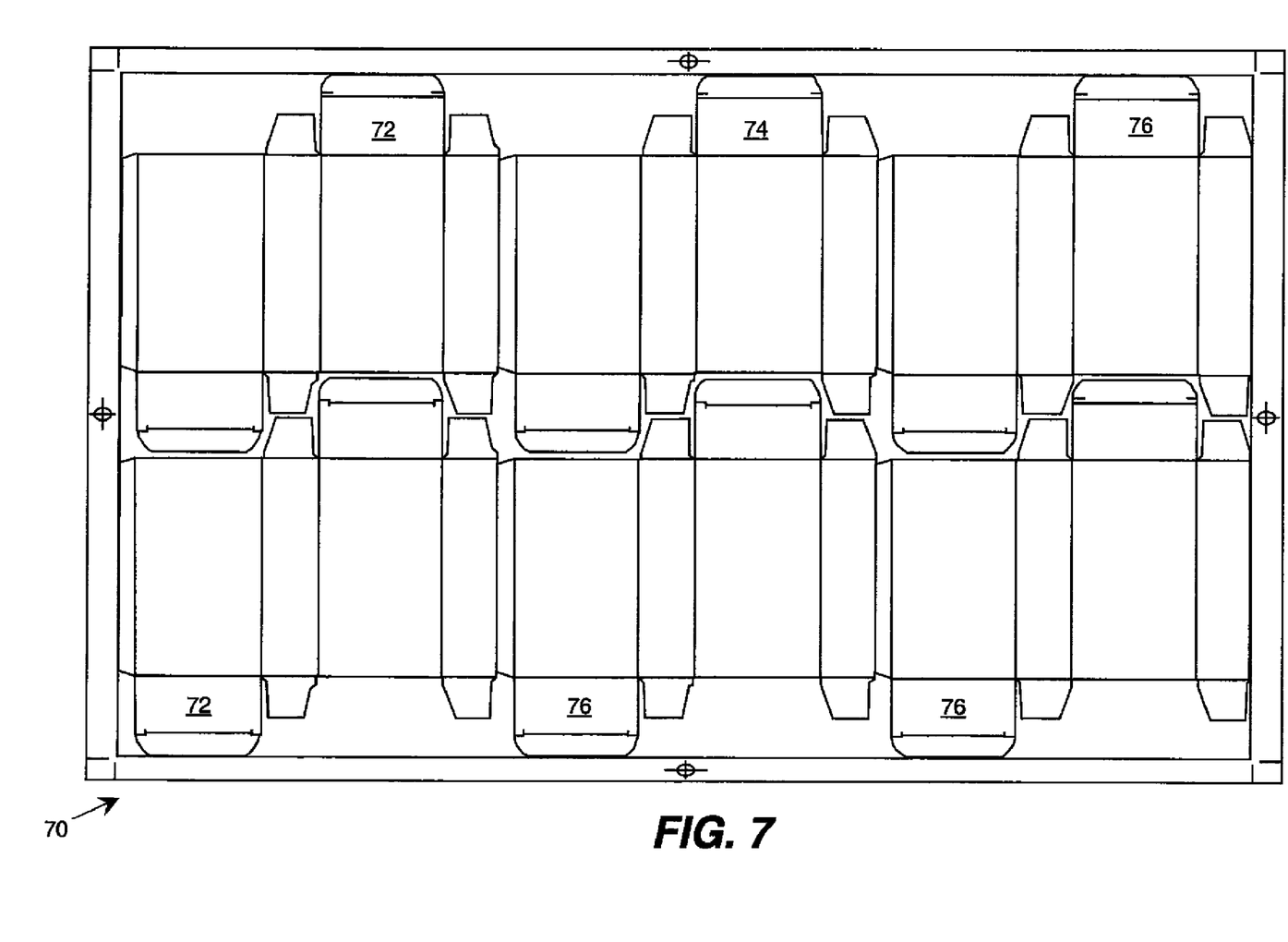
FIG. 7 is a schematic illustrating an imposition layout sheet with different packaging jobs on the same sheet.

FIG. 7 illustrate a packaging imposition sheet 70 with three different packaging jobs imposed on the sheet. The example shows the same die cut design for all three jobs 72, 74, and 76, but with different artwork. Job 72 has two instances on sheet 70, job 74 one instance, and job 76 three instances.

Figure 8:
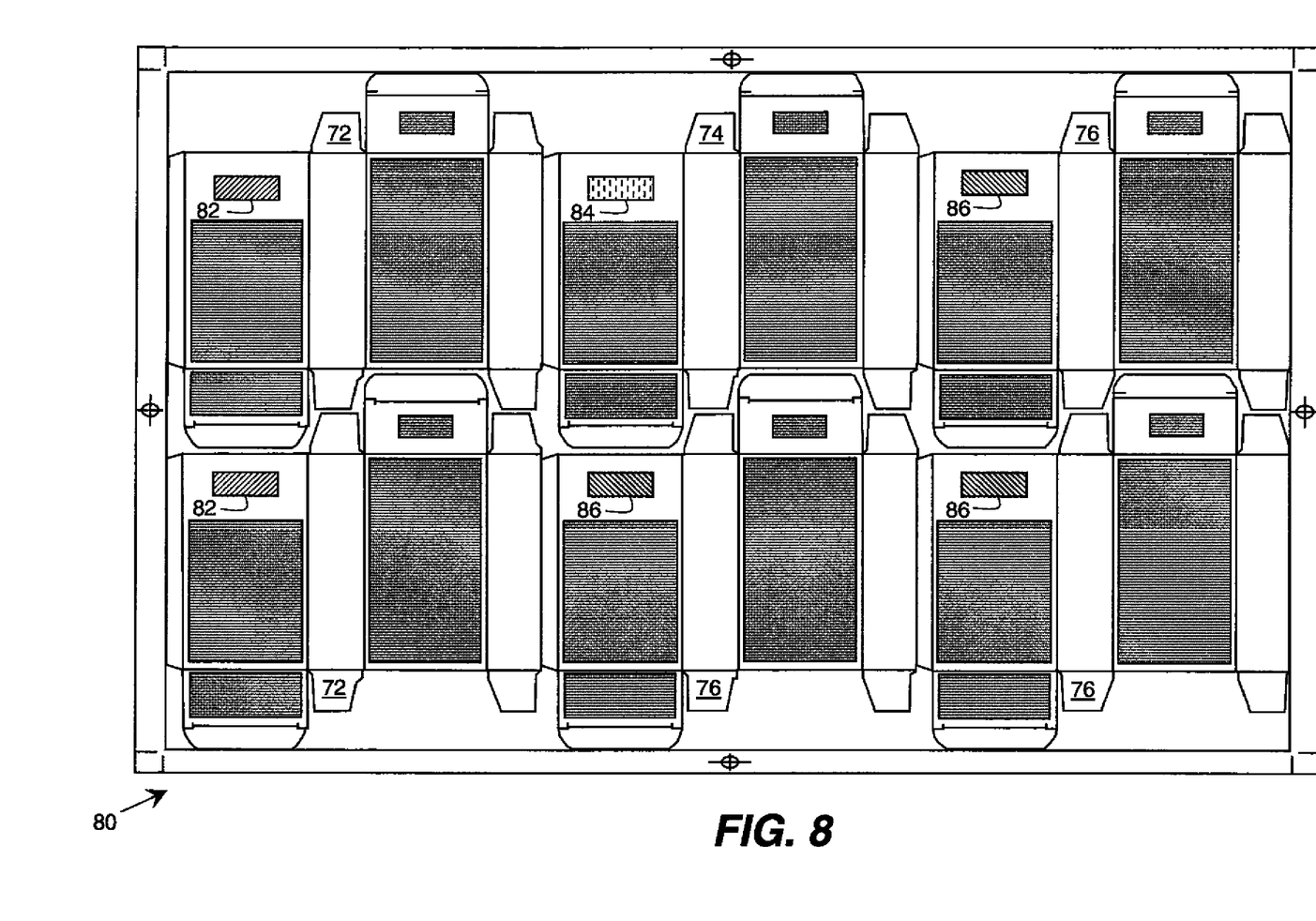
FIG. 8 is a schematic illustrating an imposition layout sheet with different packaging jobs wherein each packaging job is a variable information job and all jobs and are printed on the same sheet.

Reference is made to FIG. 8 which illustrates packaging imposition sheet 80 similar to 70. Packaging imposition sheet 80 is configured in addition to populate the instances of each of the jobs 72, 74, and 76 with variable data streams 82, 84, and 86 configured to automatically change populate the variable components designed on packaging imposition sheet 80.

The variable component population can be performed before the raster image processor (RIP) or during the RIP by equipping the RIP with variable information processing means. The Creo RIP used in the Creo digital color server is capable to process Creo Variable Postscript (VPS), personalized print markup language (PPML) or other formats such PDF equipped with variable data components. In order to take advantage of VPS capable RIP, the data that is generated by the packaging sheet design application has to be provided is a VPS format or other variable information capable format such as PPML.

The invention has been described in detail with particular reference to certain preferred embodiments thereof but it will be understood that variations and modifications can be effected within the scope of the invention.

PARTS LIST 10 packaging element
22 packaging element
24 packaging element
26 packaging element
30 printed imposition sheet
34 packaging element
40 packaging imposition sheet
44 variable component
45 variable component
46 variable component
47 variable component
50 packaging imposition sheet
52 die cut design
53 die cut design
54 die cut design
55 die cut design
60 packaging imposition sheet
62 packaging element
70 packaging imposition sheet
72 job 1 imposed on sheet 70
74 job 2 imposed on sheet 70
76 job 3 imposed on sheet 70
80 packaging imposition sheet
82 variable element stream for job 72
84 variable element stream for job 74
86 variable element stream for job 76
91 variable data records repository
92 variable component
93 variable component
94 variable component
95 variable packaging document
96 variable packaging document
97 variable packaging document

The invention claimed is:

1. A printing imposition method for creating packaging imposition schemes comprising the steps of:
    a) providing target printing sheet properties;
    b) providing at least one designed package element wherein said designed package element includes at least one variable information object and wherein said at least one variable information object is populated according to the following steps;
    c) providing a variable data records repository wherein each of said data records will include variable information data associated with said at least one variable information object to be further populated into said at least one variable information object;
    d) retrieving next record of variable information data from said variable data records repository and wherein said variable information data is automatically populated into previously defined at least one variable information object,
    e) creating variable package elements by merging said variable information data and said at least one variable information object in said at least one designed package element;
    f) positioning said created variable package elements on said target printing sheet according to said target printing sheet properties wherein each of said variable package elements is positioned at a predefined distance from a previously positioned variable package element; and
    g) if not all records of said repository are read go to step d), otherwise stop.

2. A printing imposition method according to claim 1 wherein target printing sheet properties is sheet size.

3. A printing imposition method according to claim 1 wherein said designed package element is created by a packaging design application and is provided in a digital form.

4. A printing imposition method according to claim 1 wherein variable information data is retrieved from a variable information data is retrieved from a variable data records repository.

5. A printing imposition method according to claim 1 wherein variable information object is textual information.

6. A printing imposition method according to claim 1 wherein variable information object is graphical information.

7. A printing imposition method according to claim 1 wherein variable information object is image information.

8. A printing imposition method according to claim 1 wherein multiple target sheets are printed.

9. A printing imposition method for packaging comprising:
    a) providing an imposition sheet;
    b) providing imposition sheet properties;
    c) providing a first designed package element wherein said designed package element includes a first variable information object;

d) providing first variable information data wherein said first variable information data is retrieved from a first variable data records repository in an automatic manner;
e) inserting said first variable information data in said first variable information object;
f) creating a first variable package element by merging said first variable information data and said first variable information object in said first designed package element;
g) providing a second designed package element wherein said designed package element includes a second variable information object;
h) providing second variable information data wherein said second variable information data is retrieved from a second variable data records repository in an automatic manner;
i) inserting said second variable information data in said second variable information object;
j) creating a second variable package element by merging said second variable information data and said second variable information object in said designed package element; and
k) printing said first and second variable package elements on said imposition sheet according to said imposition sheet properties.

10. A printing imposition method according to claim 9 wherein a die cut of said first designed package element is different from a die cut of said second design package element.

11. A printing imposition method for packaging comprising:
a) providing an imposition sheet;
b) providing imposition sheet properties;
c) providing a first designed package element wherein said designed package element includes a first variable information object;
d) providing first variable information data wherein said first variable information data is retrieved from a first variable data records repository in an automatic manner;
e) inserting said first variable information data in said first variable information object;
f) creating a first variable package element by merging said first variable information data and said first variable information object in said first designed package element;
g) providing a second designed package element wherein said designed package element includes a second variable information object;
h) providing second variable information data wherein said second variable information data is retrieved from a second variable data records repository in an automatic manner;
i) inserting said second variable information data in said second variable information object;
j) creating a second variable package element by merging said second variable information data and said second variable information object in said designed package element;
k) printing said first and second variable package elements on said imposition sheet according to said imposition sheet properties; and
wherein a die cut of said first designed package element is different from a die cut of said second design package element.

* * * * *